United States Patent [19]
Heinouchi

[11] Patent Number: 5,635,647
[45] Date of Patent: Jun. 3, 1997

[54] PIEZOELECTRIC VIBRATOR

[75] Inventor: Yoshiaki Heinouchi, Joyo, Japan

[73] Assignee: Murata Manufacturing Co., Ltd., Kyoto-Fu, Japan

[21] Appl. No.: 432,624

[22] Filed: May 2, 1995

[30] Foreign Application Priority Data

May 12, 1994 [JP] Japan .................... 6-124444

[51] Int. Cl.⁶ .................... G01P 15/08; H01L 41/08
[52] U.S. Cl. .................... 73/662; 73/493; 73/504.12; 73/504.14; 73/514.29; 310/321; 310/348; 310/351; 310/352
[58] Field of Search .................... 73/504.12, 504.14, 73/514.29, 493, 662; 310/315, 316, 329, 321, 326, 348, 352, 351, 353, 322, 334

[56] References Cited

U.S. PATENT DOCUMENTS

| | | | |
|---|---|---|---|
| 5,345,822 | 9/1994 | Nakamura et al. | 73/505 |
| 5,455,476 | 10/1995 | Nakamura | 310/316 |
| 5,493,166 | 2/1996 | Kasanami et al. | 310/351 |
| 5,497,044 | 3/1996 | Nakamura et al. | 310/348 |

FOREIGN PATENT DOCUMENTS

| | | | |
|---|---|---|---|
| 5034162 | 2/1993 | Japan | 73/504.14 |

*Primary Examiner*—Hezron E. Williams
*Assistant Examiner*—Rose M. Miller
*Attorney, Agent, or Firm*—Nikaido Marmelstein Murray & Oram LLP

[57] ABSTRACT

A vibrating gyroscope 10 includes a piezoelectric vibrator 12. The piezoelectric vibrator 12 includes a vibrating body 14 having a regular triangular prism shape. Grooves 16 are formed on one side face of the vibrating body 14 along its width direction. The grooves 16 are formed at portions corresponding to nodal points of the vibrating body 14. Piezoelectric elements 18a, 18b and 18c are formed on three side faces of the vibrating body 14. An M-shaped supporting members 26 are attached to the vibrating body 14 at portions in grooves 16.

8 Claims, 4 Drawing Sheets 5,635,647

PIEZOELECTRIC VIBRATOR

BACKGROUND OF THE INVENTION

1. Field of the Invention

The present invention relates to a piezoelectric vibrator, and particularly to a piezoelectric vibrator which uses in a vibrating gyroscope for detecting a rotational angular velocity.

2. Description of the Prior Art

FIG. 6 is a perspective view showing an example of a vibrating gyroscope using a conventional piezoelectric vibrator, and FIG. 7 is its sectional view. A vibrating gyroscope 1 includes a piezoelectric vibrator 2. The piezoelectric vibrator 2 includes a vibrating body 3 having, for example, a regular triangular prism shape. Piezoelectric elements 4a, 4b and 4c are formed respectively on three side faces of the vibrating body 3. A ridge line of the vibrating body 3 between the piezoelectric elements 4a and 4b is supported by supporting members 5 at the portions in the vicinity of two nodal points. An oscillation circuit is connected between the piezoelectric elements 4a, 4b and the piezoelectric element 4c. The piezoelectric elements 4a and 4b are connected to a differential circuit. The differential circuit is connected to a detection circuit, and the detection circuit is connected to a smoothing circuit.

The vibrating body 3 makes a bending vibration in a direction perpendicular to the face of the piezoelectric element 4c by a signal of the oscillation circuit. When a rotational angular velocity is not applied to the vibrating gyroscope 1, the piezoelectric elements 4a and 4b bend in the same state, and the same signals are supplied to the differential circuit. Thus, the signals are offset in the differential circuit, and an output signal is not obtained from the differential circuit. When the vibrating gyroscope 1 rotates about an axis of the vibrating body 3, the direction of bending vibration of the vibrating body 3 changes by Coriolis force. Thus the bending states of the piezoelectric elements 4a and 4b change, and different signals are obtained from the piezoelectric elements 4a and 4b connected to the differential circuit. Then, an output signal is obtained from the differential circuit, and the output signal is detected by the detection circuit, and smoothed by the smoothing circuit. Since the smoothed signal corresponds to a rotational angular velocity, the rotational angular velocity applied to the vibrating gyroscope 1 is detected by measuring the smoothed signal.

However, in the vibrating gyroscope, though the supporting members are attached to the ridge line of the vibrating body at portions in the vicinity of nodal points, a vibration leakage from the supporting members can not be prevented because the real nodal points exist on a central axis of the vibrating body. By the reason, in the vibrating gyroscope using such piezoelectric vibrator, stable drift characteristics can not be obtained.

SUMMARY OF THE INVENTION

It is therefore a primary object of the invention to provide a piezoelectric vibrator which has less vibration leakage from supporting members, and has stable drift characteristics.

The present invention is directed to a piezoelectric vibrator comprising a prism-shaped vibrating body for making a bending vibration, and the supporting members for supporting the vibrating body at portions in the vicinity of nodal points of the vibrating body, wherein grooves are formed on the vibrating body along its width direction at portions in the vicinity of the nodal points of the vibrating body.

In the piezoelectric vibrator, when the vibrating body is formed in a regular triangular prism shape, it is desirable to form the grooves on one side face of the vibrating body.

At this time, it is desirable to form the grooves each having a depth which is ⅓ of a distance from one side face of the vibrating body toward an opposite ridge line.

By forming grooves on the prism-shaped vibrating body, the supporting members can be attached to the vibrating body at portions in the vicinity of real nodal points. Since the grooves are formed along its width direction of the vibrating body, an influence to the bending vibration of the vibrating body is little. When the vibrating body is formed in a regular triangular prism shape, the real nodal points exist at portions whose depth is about ⅓ of distance from one side face of the vibrating body toward the opposite ridge line. Thus, by forming the grooves having the depth which is ⅓ of the distance from one side face of the vibrating body toward the opposite ridge line, the vibrating body can be supported at portions in the vicinity of the real nodal points of the vibrating body.

According to the present invention, the vibrating body can be supported at portions in the vicinity of the real nodal points. Thus, a vibration leakage from the supporting members can be reduced. When the piezoelectric vibrator is used, it is possible to obtain a vibrating gyroscope having less vibration leakage, and desirable drift characteristics.

The above and other objects, features, aspects and advantages of the present invention will become more apparent from the following detailed description of the embodiments made with reference to the drawings.

DESCRIPTION OF THE PREFERRED EMBODIMENTS

Figure 1:
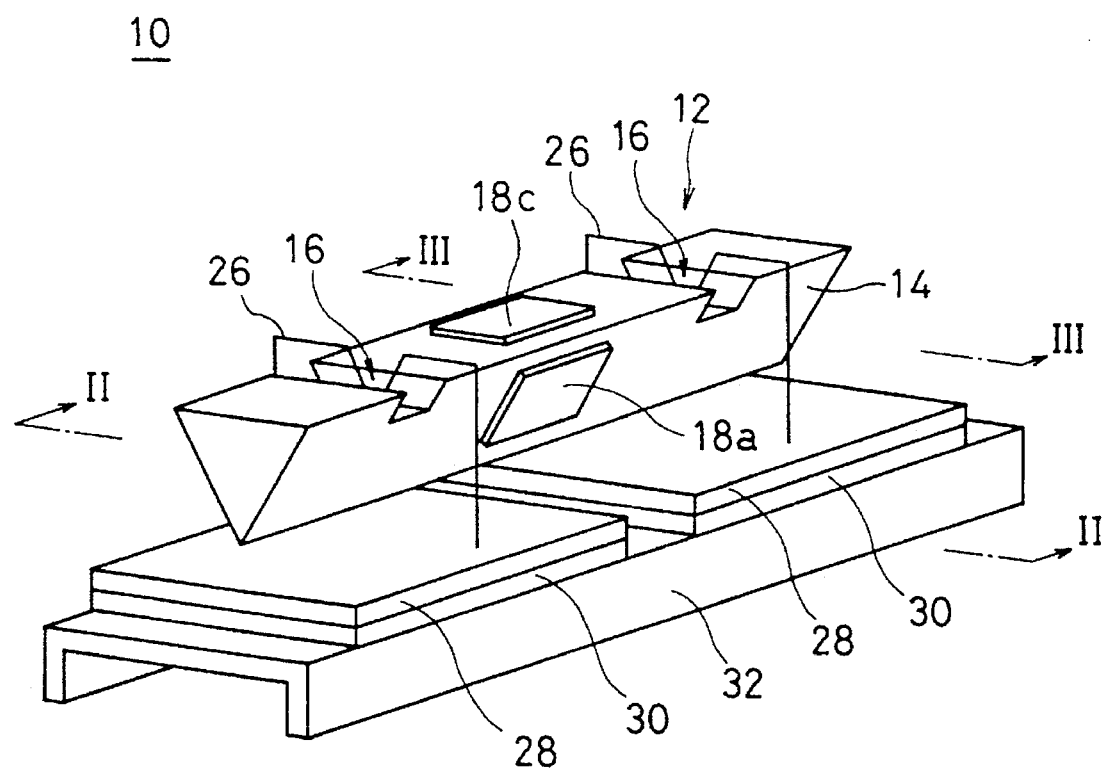
FIG. 1 is a perspective view showing an example of a vibrating gyroscope using a piezoelectric vibrator of the present invention.
Figure 2:
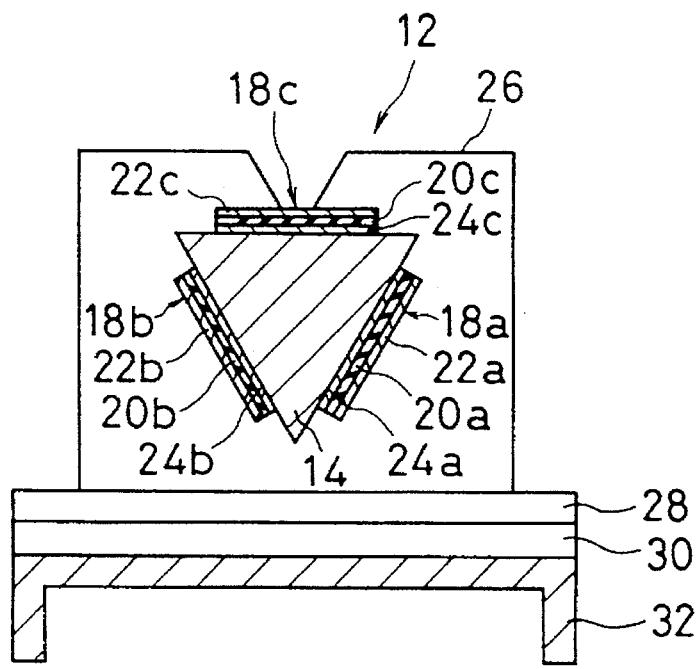
FIG. 2 is a sectional view taking along a line II—II in FIG. 1.
Figure 3:
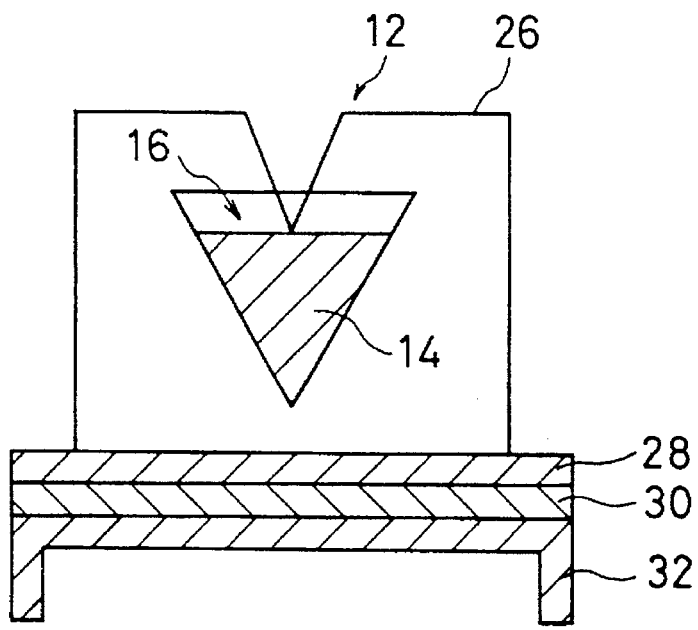
FIG. 3 is a sectional view taking along a line III—III in FIG. 1.

FIG. 1 is a perspective view showing an example of a vibrating gyroscope using a piezoelectric vibrator of the present invention, and FIG. 2 is a sectional view taking along a line II—II in FIG. 1, and FIG. 3 is a sectional view taking along a line III—III in FIG. 1. A vibrating gyroscope 10 includes a piezoelectric vibrator 12. The piezoelectric vibrator 12 includes a vibrating body 14 having, for example, a regular triangular prism shape. The vibrating body 14 is made of material which makes a mechanical vibration such as elinver, iron-nickel alloy, crystal, glass, quartz or ceramics.

Two grooves 16 are formed on one side face of the vibrating body 14 along its width direction. The real nodal points exist on a central axis of the vibrating body 14, and the grooves 16 are formed at portions corresponding to the real nodal points. Each of the grooves 16 has a depth of about ⅓ of the distance from the side face of the vibrating body 14 toward the opposite ridge line. It is because the central axis of the vibrating body 14 exists at that portion.

Piezoelectric elements 18a, 18b and 18c are formed at center portions on three side faces of the vibrating body 14. The piezoelectric elements 18a and 18b are formed on side faces which have no grooves, and the piezoelectric element 18c is formed on the side face which has the grooves 16. The piezoelectric element 18a includes a piezoelectric layer 20a made of ceramics or the like, and electrodes 22a, 24a are formed on both faces of the piezoelectric layer 20a. One electrode 24a is bonded on the side face of the vibrating body 14 with adhesive. Similarly, the piezoelectric elements 18b and 18c include respectively piezoelectric layers 20b and 20c. On both faces of the piezoelectric layers 20b and 20c, electrodes 22b, 24b and electrodes 22c, 24c are formed. The electrodes 24b and 24c are bonded on side faces of the vibrating body 14 with adhesive.

Supporting members 26 are attached to the vibrating body 14 at portions in the grooves 16. The supporting members 26 are formed, for example, by bending metal wires. In this embodiment, the metal wire is bent in an M-shape to make the supporting member 26, and the center portion is attached to the vibrating body 14 at the portion of the groove 16. The supporting members 26 are attached to the vibrating body 14 by welding or bonding. Ends of the supporting members 26 are secured to two supporting substrates 28. The supporting substrates 28 are attached to a base substrate 32 via buffers 30. The buffers 30 are used for preventing an influence of a leaked vibration to the vibrating body via the supporting members, when the vibration of the vibrating body 14 leaks from the supporting members.

Figure 4:
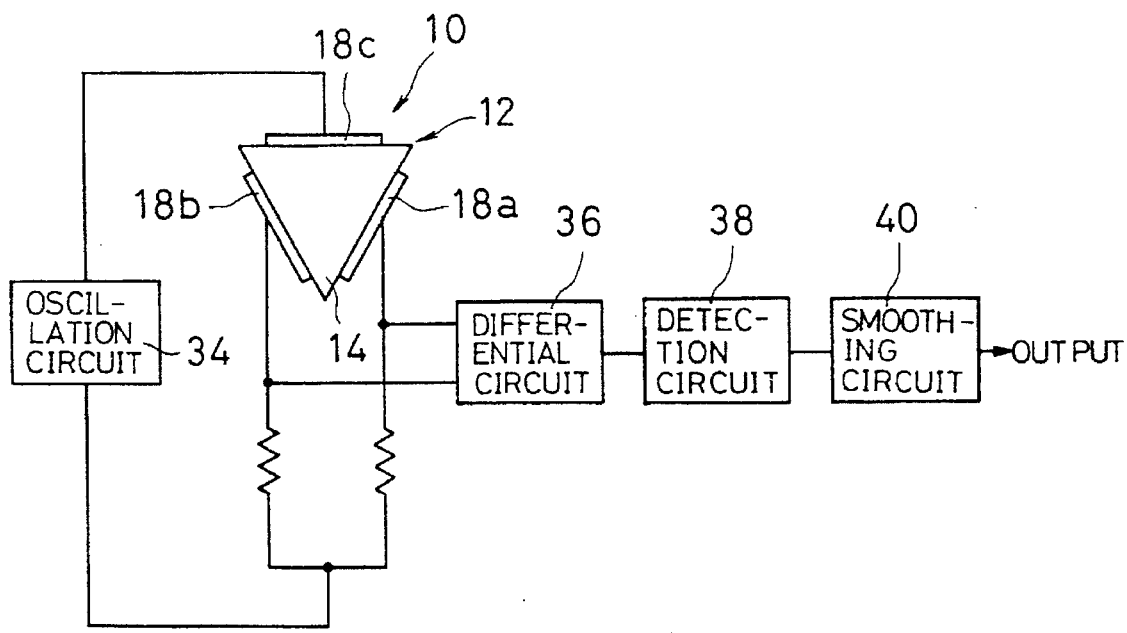
FIG. 4 is an illustrative view showing a circuit for driving and detecting the vibrating gyroscope shown in FIG. 1.

For using the vibrating gyroscope 10, as shown in FIG. 4, an oscillation circuit 34 is connected between the piezoelectric elements 18a, 18b and the piezoelectric element 18c. A signal of the oscillation circuit 34 is supplied to the piezoelectric elements 18a, 18b, and an output signal of the piezoelectric element 18c is supplied to the oscillation circuit 34 as a feedback signal. By the signal of the oscillation circuit 34, the vibrating body 14 makes a bending vibration in a direction perpendicular to a face of the piezoelectric element 18c. The piezoelectric elements 18a and 18b are connected to input terminals of a differential circuit 36. An output terminal of the differential circuit 36 is connected to a detection circuit 38, and a signal detected by the detection circuit 38 is smoothed by a smoothing circuit 40. When a rotational angular velocity is not applied to the vibrating gyroscope 10, since the vibrating body 14 makes a bending vibration in a direction perpendicular to the face of piezoelectric element 18c, the piezoelectric elements 18a and 18b bends in the same state, and the same signals are supplied to the differential circuit 36. Thus, an output signal is not obtained from the differential circuit 36, and it is known that a rotational angular velocity is not applied to the vibrating gyroscope 10.

When the vibrating gyroscope 10 rotates about an axis of vibrating body 14, the direction of the bending vibration of the vibrating body 14 changes by Coriolis force. When the direction of the bending vibration of the vibrating body 14 changes, the piezoelectric elements 18a and 18b bend in different state, and different signals are obtained from the piezoelectric elements 18a and 18b. Since these signals are supplied to the differential circuit 36, the difference between two input signals is obtained from the differential circuit 36. The output signal of the differential circuit 36 is detected by the detection circuit 38, and the output signal of the detection circuit 38 is smoothed by the smoothing circuit 40. The output signal of the smoothing circuit 40 corresponds to the change of a bending state of the vibrating body 14, namely corresponds to the Coriolis force. Therefore, by measuring the output signal of the smoothing circuit 40, the rotational angular velocity applied to the vibrating gyroscope 10 can be detected.

In the vibrating gyroscope 10, since the grooves 16 are formed on the vibrating body 14, the supporting members 26 can be attached to the vibrating body 14 at portions in the vicinity of the real nodal points. Thus, the vibration of the vibrating body 14 hardly leaks from the supporting members 26. Therefore, it is possible to obtain a flat drift characteristics having little fluctuation. According to the experiment, the mechanical Qm can be increased by 20% because of reducing a vibration leakage.

Figure 5:
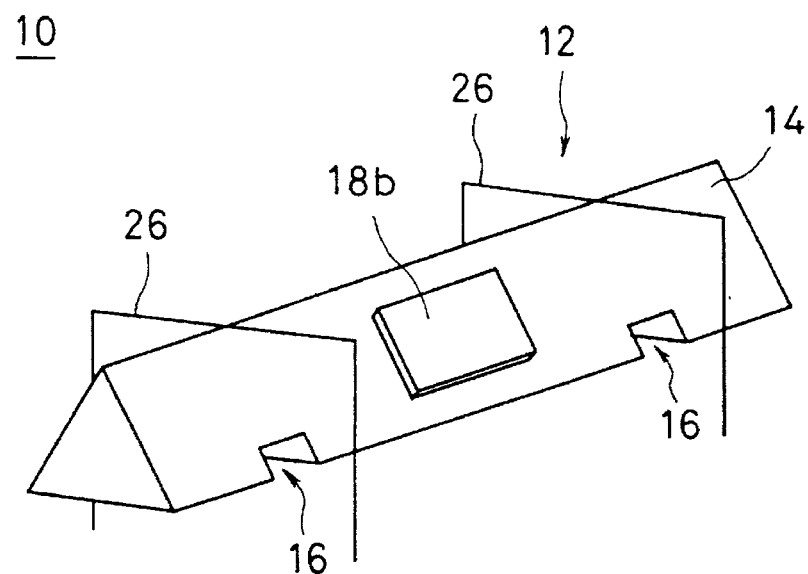
FIG. 5 is a perspective view showing an another embodiment of the present invention.
Figure 6:
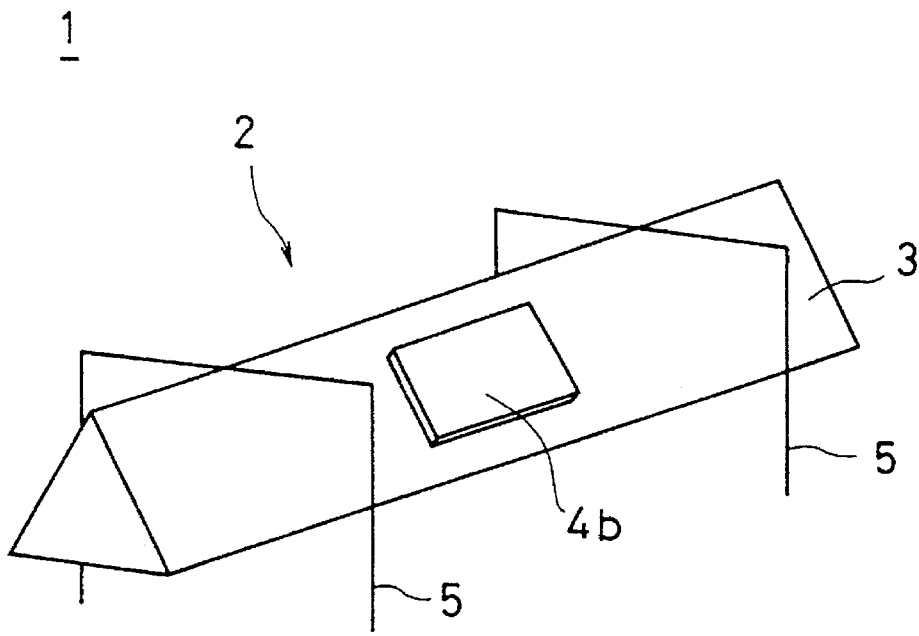
FIG. 6 is a perspective view showing an example of a vibrating gyroscope using a conventional piezoelectric vibrator.
Figure 7:
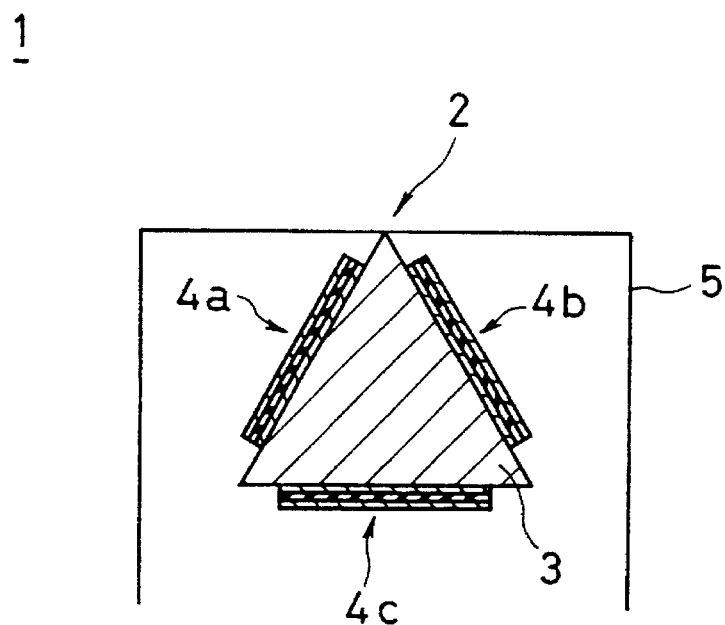
FIG. 7 is a sectional view showing the conventional piezoelectric vibrator shown in FIG. 6.

As shown in FIG. 5, the supporting members 26 may be attached to the vibrating body 14 at the ridge line portion opposite to the side face having the grooves 16. In this case too, since the nodal points move to the ridge line side by forming the grooves 16 on the vibrating body 14, the vibrating gyroscope 10 having less vibration leakage can be obtained.

In the above embodiment, though the piezoelectric vibrator is made by forming the piezoelectric elements on the faces of the vibrating body, the piezoelectric vibrator may be made by forming the vibrating body with piezoelectric material, and making electrodes at the same portion which the piezoelectric elements have been formed. In this case, a vibration leakage from the supporting members can be reduced by forming the grooves on the vibrating body along its width direction at portions in the vicinity of nodal points. As the shape of the vibrating body, another prism shapes may be adopted such as, for example, a rectangular prism shape or a circular prism shape. In case of using such vibrating body, the piezoelectric vibrator having less vibration leakage can be obtained by forming the grooves.

While the present invention has been particularly described and shown, it is to be understood that such description is used merely as an illustration and example rather than limitation, and the spirit and scope of the present invention is determined solely by the terms of the appended claims.

What is claimed is:

1. A piezoelectric vibrator comprising:

a prism-shaped vibrating body for making a bending vibration; and supporting members for supporting said vibrating body at portions in a vicinity of nodal points of said vibrating body, wherein grooves are formed on only one side face of said vibrating body along a width direction at portions in the vicinity of the nodal points of said vibrating body.

2. A piezoelectric vibrator in accordance with claim 1, wherein said vibrating body is formed in a regular triangular prism shape.

3. A piezoelectric vibrator in accordance with claim 2, wherein each of said grooves has a depth which is ⅓ of a distance from said one side face of said vibrating body toward an opposite ridge line.

4. A piezoelectric vibrator in accordance with claim 1, wherein said supporting members are attached to said vibrating body at portions in said grooves.

5. A piezoelectric vibrator in accordance with claim 2, wherein said supporting members are attached to said vibrating body at portions in said grooves.

6. A piezoelectric vibrator in accordance with claim 3, wherein said supporting members are attached to said vibrating body at portions in said grooves.

7. A piezoelectric vibrator in accordance with claim 2, wherein said supporting members are attached to said vibrating body at a ridge line portions opposite to said grooves.

8. A piezoelectric vibrator in accordance with claim 3, wherein said supporting members are attached to said vibrating body at a ridge line portions opposite to said grooves.

* * * * *